US006152419A

United States Patent [19]

Bender

[11] Patent Number: 6,152,419

[45] Date of Patent: Nov. 28, 2000

[54] ANTI-THEFT DEVICE FOR COATS, HANDBAGS, AND THE LIKE

[76] Inventor: Michael J. Bender, 6284 Occoquan Forest Dr., Manassas, Va. 20112

[21] Appl. No.: 09/339,024

[22] Filed: Jun. 23, 1999

[51] Int. Cl.[7] .......... F16H 13/00

[52] U.S. Cl. .......... 248/551; 211/4

[58] Field of Search .......... 248/551, 552, 248/553, 341, 914; 70/59, 66, 68, 57.1, 459; 403/43; 24/326, 327, 328, 598.8, 598.3; 59/84, 85

[56] References Cited

U.S. PATENT DOCUMENTS

| | | | |
|---|---|---|---|
| 195,940 | 10/1877 | Martin | 24/598.2 |
| 263,245 | 8/1882 | Thomas | 24/598.2 |
| 672,390 | 4/1901 | Sudheimer et al. | 70/59 |
| 691,433 | 1/1902 | Baker | 24/598.8 |
| 972,535 | 10/1910 | Hoover | 70/59 |
| 1,848,989 | 3/1932 | Blakely | 410/7 |
| 2,325,349 | 7/1943 | Vineberg | 70/59 |
| 3,378,144 | 4/1968 | Webster | 211/4 |
| 3,574,373 | 4/1971 | Derf et al. | 403/296 |
| 4,956,982 | 9/1990 | Valley | 70/59 |
| 5,016,284 | 5/1991 | Brown | 2/69 |
| 5,454,662 | 10/1995 | Skibitzke et al. | 403/396 |
| 5,713,686 | 2/1998 | Maughan | 403/46 |
| 5,765,801 | 6/1998 | Geiselman | 70/59 |

*Primary Examiner*—Anita M. King
*Assistant Examiner*—Gwendolyn Baxter
*Attorney, Agent, or Firm*—William D. Stokes

[57] ABSTRACT

An anti-theft device for securing one's personal belongings, such as a coat, handbag and the like, to the interior wall surface of a commode door wherein a bail is secured to the door by a plate. The bail has spaced, oppositely extending bent threaded end portions having a sleeve threadably mounted thereon for closing the space therebetween. The loop or handle of a person's belongings is inserted through the space between the bent threaded end portions and supported by one of the bent end portions. The sleeve is turned to close the space between the end portions, and thus, secures the handle or loop within the confines of the bail. A chain is connectable to the bail for securing a personal belonging thereto.

6 Claims, 2 Drawing Sheets

ANTI-THEFT DEVICE FOR COATS, HANDBAGS, AND THE LIKE

BACKGROUND OF THE INVENTION

Various anti-theft devices have been proposed for use in public places; such as, restaurants and rest rooms, to prevent a person's personal belongings; such as, a coat or handbag, from being stolen. These devices usually include a fixed hook portion from which the personal belonging is hung, and a jaw movable from an open position to a closed position relative to the hook portion to secure the personal belonging to the hook portion. A key is usually required to unlock the movable jaw to allow it to move to the open position so that the personal belonging can be removed from the hook portion.

While these anti-theft devices have been satisfactory for their intended purpose, they have been characterized by certain disadvantages; such as, requiring a key to unlock the device which will remain locked if the owner of the personal belonging should happen to lose the key. Another disadvantage is the complexity of these anti-theft devices using many moving parts; thus requiring high maintenance to prevent the devices from becoming out-of-order.

SUMMARY OF THE INVENTION

To overcome the disadvantages inherent in prior apparel anti-theft devices, the anti-theft device of the present invention has been devised which comprises, essentially, a mounting plate adapted to be secured to a vertical support; such as the interior surface of a commode door. The mounting plate is provided with a horizontally extending tubular portion through which a leg portion of a C link, forming a bail, extends and is pivotally mounted therein. The leg portion of the bail terminates in spaced, oppositely bent, threaded end portions having a threaded sleeve extending therebetween. Chains are connected to the bail and are employed if the personal belonging cannot fit within the confines of the bail.

In use, the threaded sleeve is turned in a direction to open the space between the threaded end portions of the bail leg. If a person's coat or purse has a loop or handle which can fit within the confines of the bail, it is inserted through the space between the threaded end portions. If the apparel loop or handle cannot fit within the confines of the bail, at least one link chain is connected to the bail and insertable through the apparel loop or handle, and a link of the chain is placed over an end of the leg portion of the bail.

The apparel is secured to the bail by turning the sleeve in an opposite direction to close the space between the opposite ends of the bail leg, whereby a thief reaching over the top of the commode door will be prevented from stealing the apparel.

DESCRIPTION OF THE PREFERRED EMBODIMENT

Figure 1:
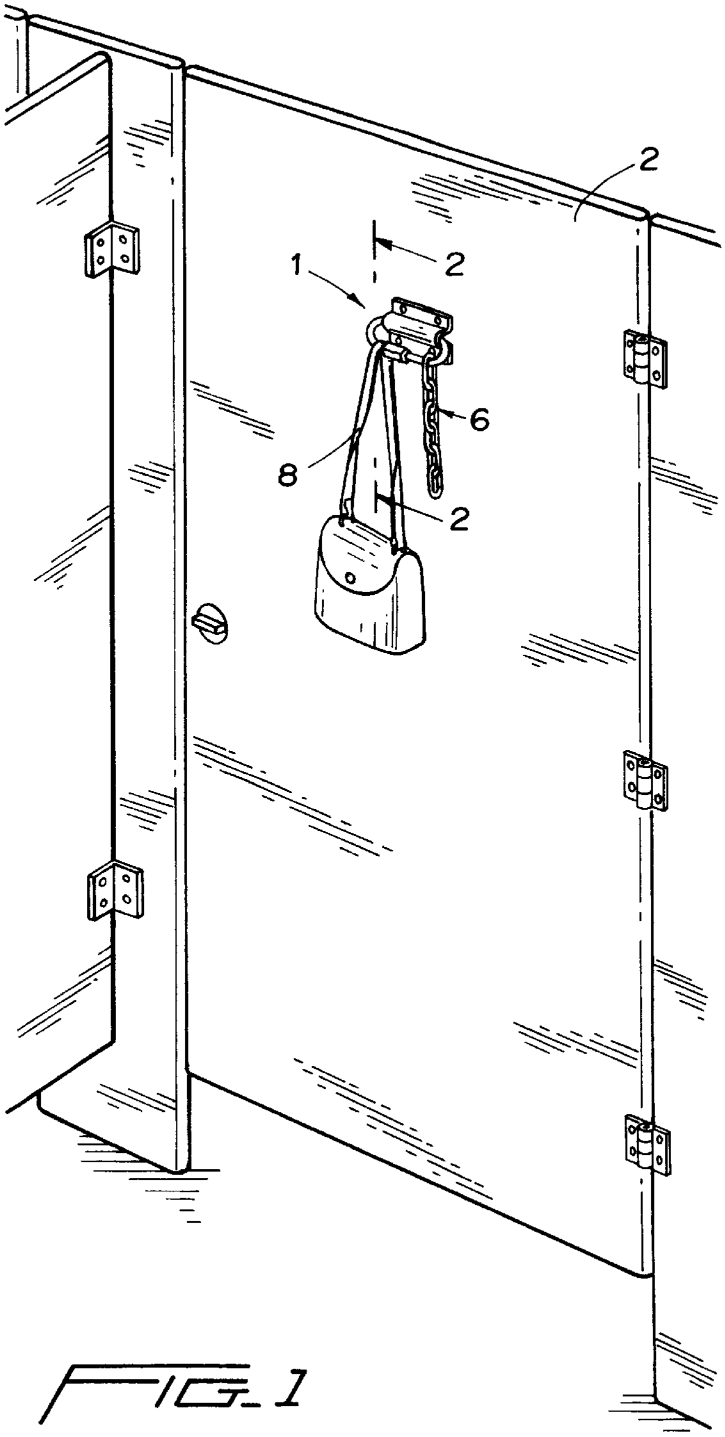
FIG. 1 is a perspective view of the anti-theft device of the present invention mounted on the interior surface of a commode door.
Figure 2:
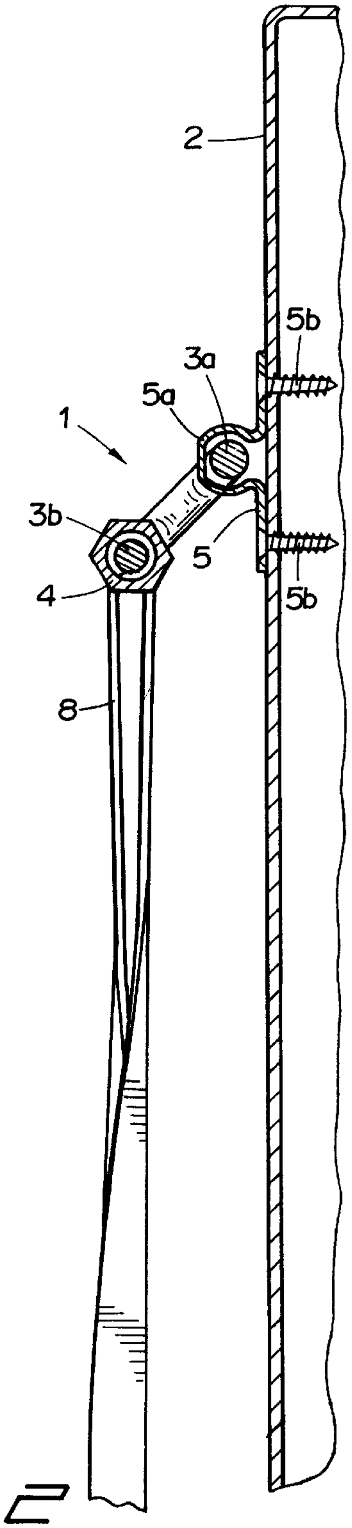
FIG. 2 is a view taken along line 2—2 of FIG. 1.
Figure 3:
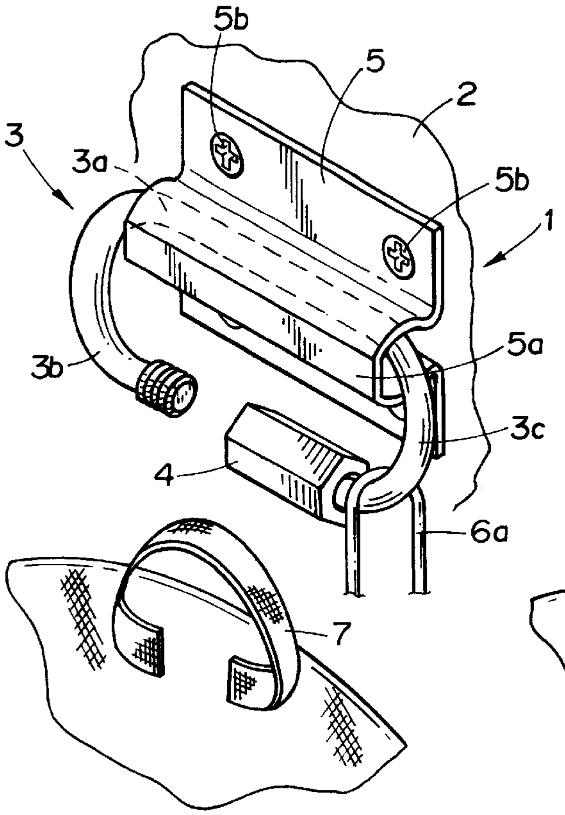
FIG. 3 is a perspective view of the anti-theft device in the open position for reception of a handle of a personal belonging.
Figure 4:
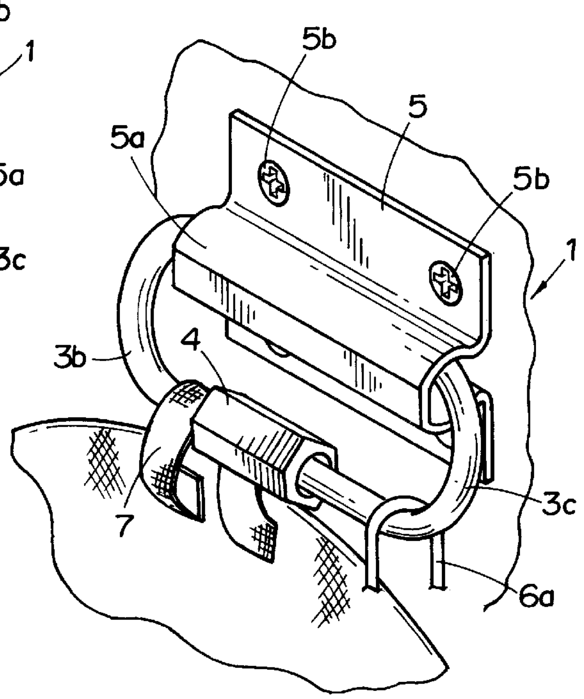
FIG. 4 is a perspective view of the anti-theft device shown in FIG. 3 in the closed or locking position.

Referring to the drawings and more particularly to FIGS. 1, 2 and 3, the anti-theft device 1 of the present invention is adapted to be secured to a vertical support; such as, the interior surface of a commode door 2. The anti-theft device 1 comprises a bail 3 formed by a C link having a leg portion 3*a* terminating in spaced, oppositely bent threaded end portions 3*b* and 3*c* having a threaded sleeve or hexagonal nut 4 extending therebetween.

The bail 3 is secured to the commode door by a mounting plate 5 having a horizontally extending tubular portion 5*a* through which the leg 3*a* of the bail 3 extends and is pivotally supported therein. The mounting plate 5 is secured to the commode door by suitable fasteners 5*b*; such as, anti-theft screws.

To complete the construction of the anti-theft device 1, a link chain 6 is connected to the bail 3 by insertion of the leg end portion 3*c* through an end link 6*a* of the chain 6. The connection of the chain 6 to the bail 3 is accomplished before the bail 3 is connected to the mounting plate 5 so that the link 6*a* is slipped onto bent end portion 3*b* and slid across leg portion 3*a* to bent end portion 3*c*. The bail 3 is then connected to the mounting plate 5. The opening in link 6*a* is smaller than the diameter of the sleeve 4 so that the chain 6 is trapped between the end of the sleeve 4 and the end of the tubular portion 5*a* of the plate 5, whereby removal of the chain 6 from the bail 3 is prevented.

In use, with the anti-theft device 1 in the open position, as shown in FIG. 3, the handle of a person's personal belonging is inserted through the space between the bent end portions 3*b* and 3*c* of the bail 3 and placed on the bent portion 3*b*, and then the threaded sleeve 4 is turned in a direction to close the space between the bent portions 3*b* and 3*c* wherein it is threadably connected to the threaded end of bent portion 3*b*.

Figure 5:
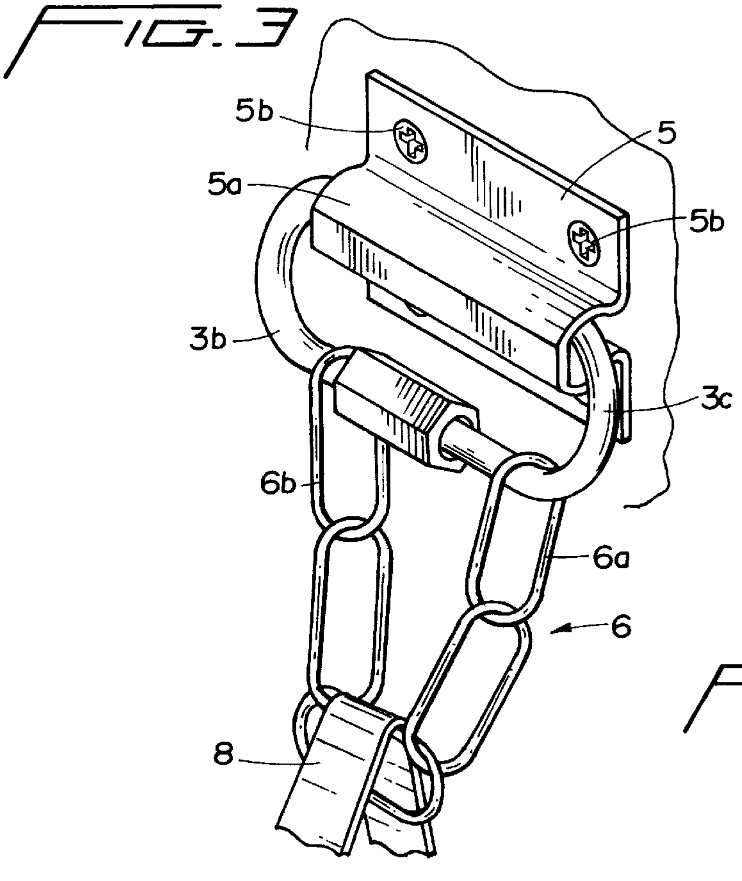
FIG. 5 is a perspective view of the anti-theft device employing a chain for securing a personal belonging thereto.

If the personal belonging has a strap or handle 8, as shown in FIG. 5, which is too large to fit into the confines of the bail 3, the chain 6 is employed wherein the chain 6 is passed through the handle 8 and the end link 6*b* of the chain 6 is placed on the bent portion 3*b*. If the strap 8 is small enough to fit within the confines of the bail 3, it can be placed directly on the bail 3 as described above.

From the above description, it will be appreciated by those skilled in the art that the anti-theft device of the present invention is an improvement on prior personal belongings anti-theft devices in that it can be easily manipulated between open and closed positions without requiring the use of a key, and it has few moving parts; thus, it is not likely to get out of order after long and continued use.

It is to be understood that the form of the invention herewith shown and described is to be taken as a preferred example of the same, and that various changes in the shape, size, and. arrangement of parts may be resorted to, without departing from, the spirit of the invention or scope of the subjoined claims.

I claim:

1. A combination of an anti-theft device and a person's belonging having a handle or loop, said device comprising a bail having a leg portion terminating in space having aligned oppositely bent threaded end portions, said leg portion being continuous and integral to thereby fixedly maintain the space between the threaded end portions, a sleeve having one end threadably mounted on one of said bent end portions, the handle of the person's belonging being supported by the other bent end portion, the opposite end of the sleeve being threadably connectable to said other bent end portion for closing the space therebetween; a supporting surface and means for fixedly mounting the bail to said supporting surface, whereby theft of the person's belonging is prevented by threading the opposite end of the sleeve onto the other bent end portion to close the space therebetween, to thereby secure the handle or loop of the personal belonging within the confines of the bail.

2. The combination according to claim 1, wherein the supporting surface is a vertical surface.

3. The combination according to claim 2, wherein the vertical surface is the inside wall surface of a commode door.

4. The combination according to claim 1 wherein the sleeve comprises a hexagonal nut.

5. An anti-theft device for a person's belongings having a handle or loop, said device comprising a bail having a leg portion terminating in space having oppositely bent threaded end portions, a sleeve having one end threadably mounted on one of said bent end portions, the opposite end of the sleeve being threadably connected to the other bent end portion for closing the space therebetween; a supporting surface, means fixedly mounting the bail to said supporting surface comprising a plate, a tubular portion provided on said plate, said leg portion extending through said tubular portion, and fasteners securing said plate to said supporting surface, and a link chain connected to said bail, a link at one end of said chain being connected to said one bent end portion of the bail, a link at the other end of said chain being supported by said other bent end portion, the portion of the chain between the end links extending through the loop or handle of the personal belonging, to thereby secure the personal belonging to the bail.

6. An anti-theft device for a person's belongings having a handle or loop, said device comprising a bail having a leg portion terminating in space having oppositely bent threaded end portions, a sleeve having one end threadably mounted on one of said bent end portions, the opposite end of the sleeve being threadably connected to the other bent end portion for closing the space therebetween; a supporting surface and means fixedly mounting the bail to said supporting surface comprising a plate, a tubular portion provided on said plate, said leg portion extending through said tubular portion, and fasteners securing said plate to said supporting surface, whereby the theft of a person's belongings is prevented by placing the handle or loop of the personal belonging on the other bent end portion and threading the opposite end of the sleeve onto the other bent end portion to close the space therebetween, to thereby secure the handle or loop of the personal belonging within the confines of the bail.

* * * * *